United States Patent
Glugla (10) Patent No.: US 11,390,264 B2
(45) Date of Patent: Jul. 19, 2022

(54) METHODS AND SYSTEM FOR CONTROLLING STOPPING OF AN ENGINE

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 16/446,542

(22) Filed: Jun. 19, 2019

(65) Prior Publication Data

US 2020/0398811 A1 Dec. 24, 2020

(51) Int. Cl.
F02D 41/00 (2006.01)
F02D 37/02 (2006.01)
B60W 10/06 (2006.01)
F02D 41/04 (2006.01)

(52) U.S. Cl.
CPC ............ B60W 10/06 (2013.01); F02D 37/02 (2013.01); F02D 41/0087 (2013.01); *F02D 41/042* (2013.01)

(58) Field of Classification Search
CPC .... F02D 41/0087; F02D 41/042; F02D 37/02; B60W 10/06
See application file for complete search history.

(56) References Cited

U.S. PATENT DOCUMENTS

| 8,663,051 | B2 | 3/2014 | Sten | |
|---|---|---|---|---|
| 9,261,040 | B2 | 2/2016 | Gibson et al. | |
| 2006/0254550 | A1* | 11/2006 | Lewis | F02P 5/1506 123/179.3 |
| 2011/0239988 | A1* | 10/2011 | Reiche | F02P 5/1506 123/406.76 |
| 2013/0226439 | A1* | 8/2013 | Hashemi | F02N 11/04 701/112 |
| 2015/0040864 | A1* | 2/2015 | Gibson | F02D 31/001 123/406.23 |
| 2016/0090101 | A1* | 3/2016 | Kiebel | F02P 5/15 701/101 |

* cited by examiner

*Primary Examiner* — Phutthiwat Wongwian
*Assistant Examiner* — Diem T Tran
(74) *Attorney, Agent, or Firm* — Vincent Mastrogiacomo; McCoy Russell LLP (57) ABSTRACT

Systems and methods for stopping rotation of an engine of a vehicle in a requested or desired crankshaft window are described. In one example, spark timing of one or more engine cylinders is adjusted responsive to an actual total number of cylinder events occurring after an engine stop request is generated.

15 Claims, 5 Drawing Sheets

METHODS AND SYSTEM FOR CONTROLLING STOPPING OF AN ENGINE

FIELD

The present description relates to methods and a system for stopping engine rotation at a desired engine stopping position.

BACKGROUND AND SUMMARY

An engine of a vehicle may stop being rotated in response to a requested by a human driver or engine rotation may be stopped automatically based on vehicle operating conditions. If the engine is stopped by simply cutting fuel flow to the engine, the engine may stop at a crankshaft angle that may increase an amount of time that it takes to restart the engine. Further, the engine may be stopped from rotating at a crankshaft angle at which engine emissions during a subsequent engine restart may not be as low as is desired. Therefore, it may be desirable to be able to reliably stop engine rotation within a requested or desired crankshaft interval.

One way to adjust an engine stopping position may be to delay ceasing fuel injection to the engine. By delaying the ceasing of fuel injection, it may be possible to cease fuel injection until a time when ceasing fuel injection may improve the possibility of stopping engine rotation in a desired crankshaft window. However, delaying ceasing of fuel injection may increase the amount of time that it takes for the engine to stop after the engine stop request. Another way to cease engine rotation and control engine stopping position may be to cease supplying fuel to the engine and to adjusting engine speed via an electric machine until the engine stops rotating at a desired or requested engine stop position. However, not all drivelines include an electric machine and that has capacity to accurately control engine stopping position due to the torque capacity of the electric machine and the inertia of the engine. For at least these reasons, it may be desirable to provide a way of stopping an engine's crankshaft from rotating such that engine's crankshaft ceases rotating within a desired or requested crankshaft window without assistance of an electric machine.

The inventor herein has recognized the above-mentioned issues and have developed an engine operating method, comprising: via a controller, transitioning from adjusting spark timing of a cylinder responsive to engine load and engine speed to adjusting the spark timing of the cylinder responsive to an actual total number of cylinder events occurring after a most recent engine stop request in response to the most recent engine stop request.

By transitioning or changing from adjusting spark timing of a cylinder responsive to engine load and engine speed to adjusting spark timing of the cylinder responsive to an actual total number of cylinder events occurring after a most recent engine stop request in response to the most recent engine stop request, it may be possible to control a position at which an engine stops rotating so that engine starting time and engine emissions may be reduced. The cylinder spark timing may be adjusted responsive to the actual total number of cylinder events occurring after the most recent engine stop request in response to the most recent engine stop request so that engine stopping position may be more predictable and repeatable. For example, a charge in a cylinder may be ignited via a spark that is timed responsive to an actual total number of cylinder events since a most engine stop request so that the ignited charge provides torque to continue engine rotation until the engine stops at a requested stopping position or so that the ignited charge provides torque to slow engine rotation at a faster rate so the engine stops at the requested engine stopping position. Such spark timing adjustments are in contrast to conventional spark timing adjustments that may be based on engine speed and load irrespective of engine position after an engine stop has been requested.

The present description may provide several advantages. In particular, the approach may improve engine starting via improving a position at which an engine ceases to rotate. Further, the approach may be implemented with cylinders combusting air-fuel mixtures at lean limits so that fuel consumption may be reduced while controlling the engine stopping position. In addition, the approach may be implemented without additional hardware to control the engine stopping position.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
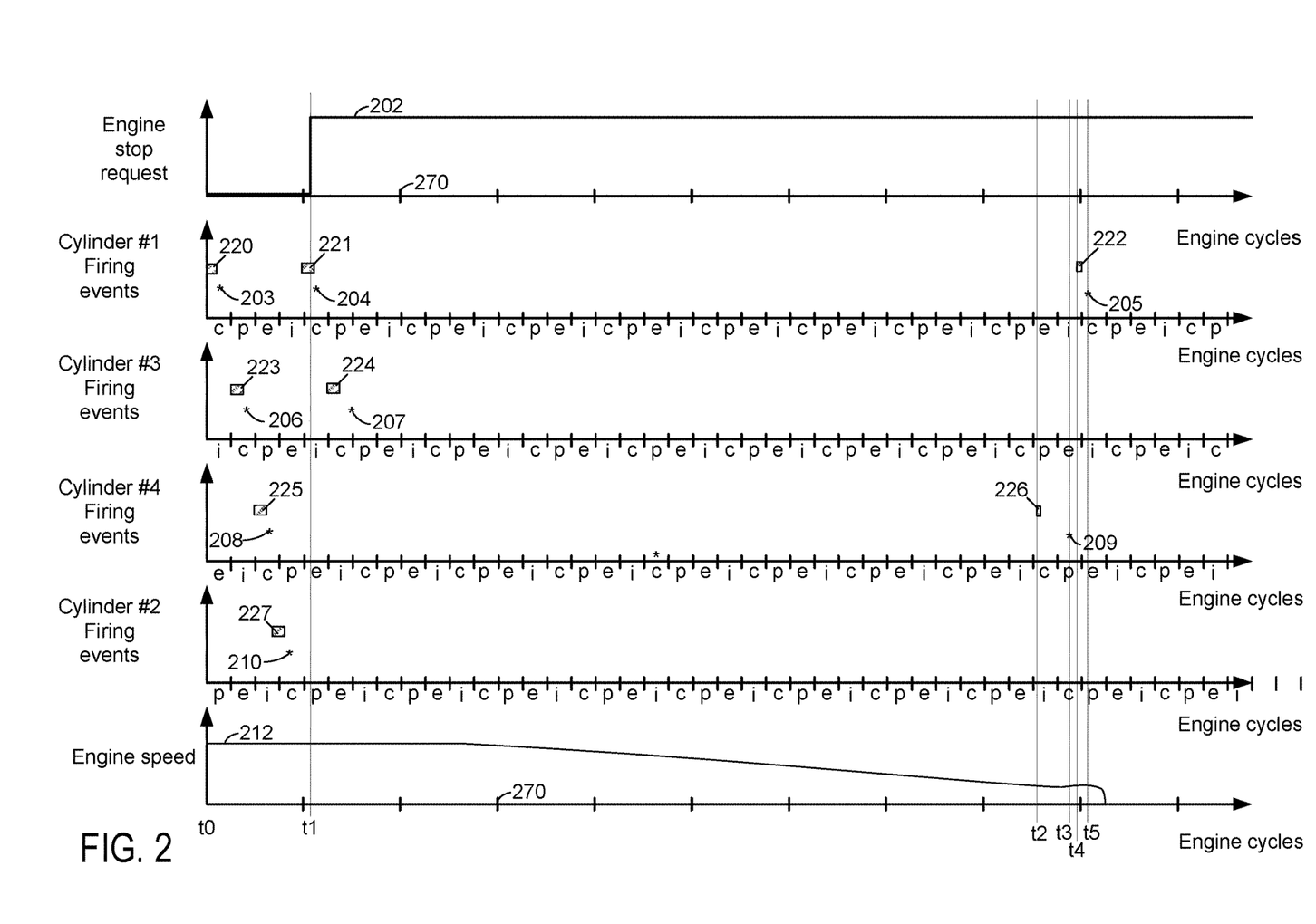
FIGS. 2 and 3 are example engine stopping sequences according to the method of FIGS. 4 and 5.
Figure 3:
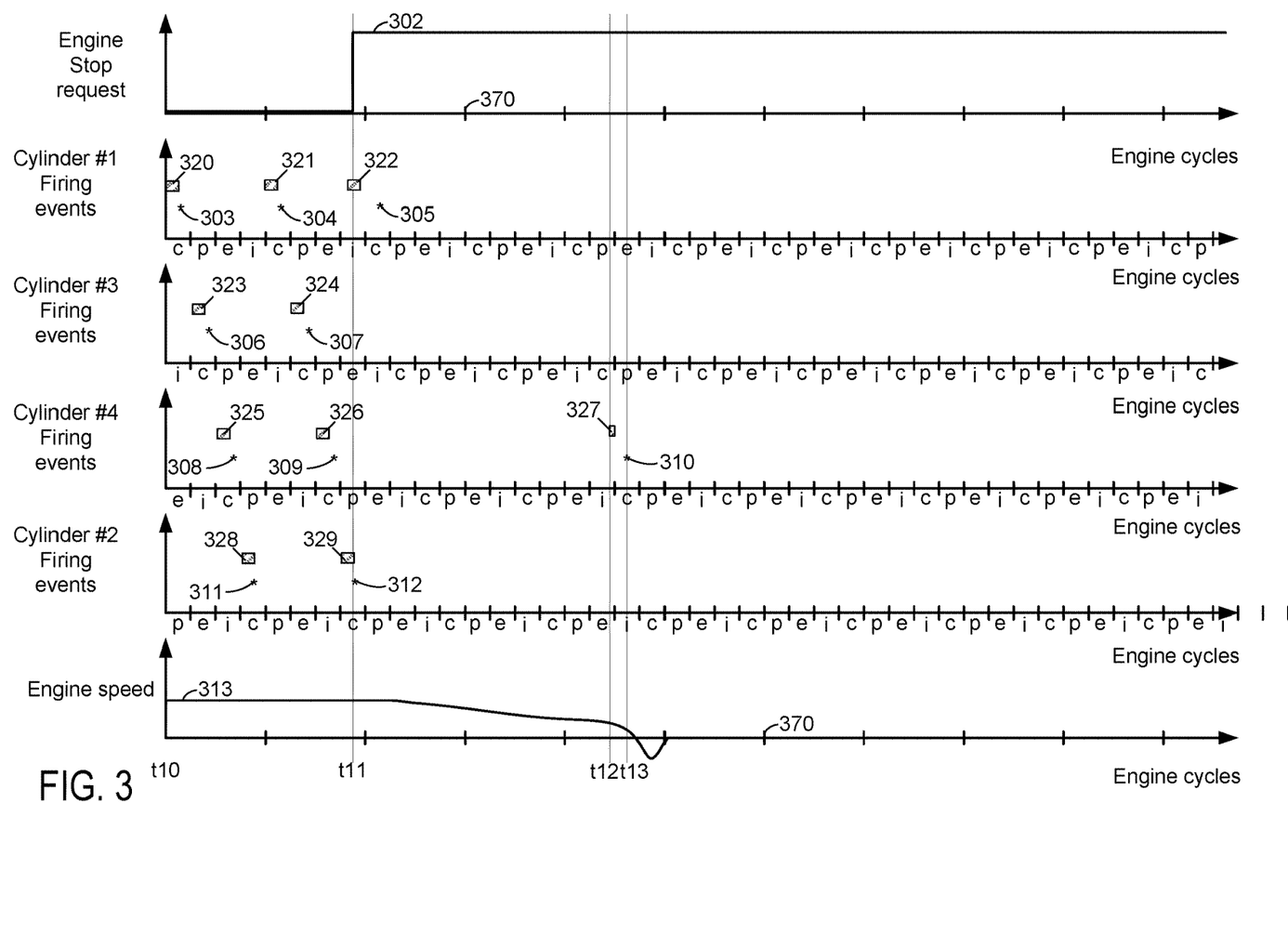
Figure 4:
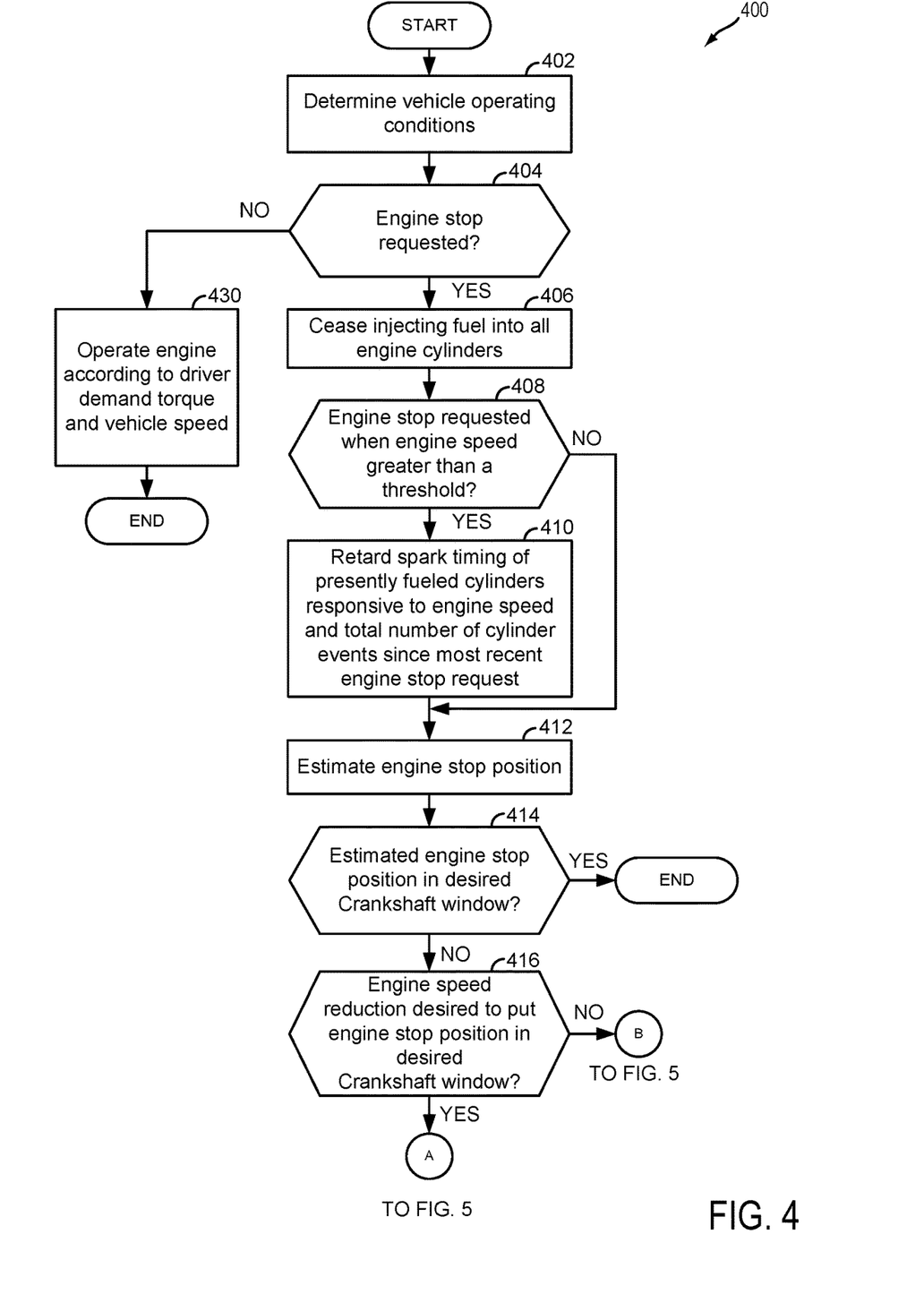
FIGS. 4 and 5 show a method for stopping an engine.
Figure 5:
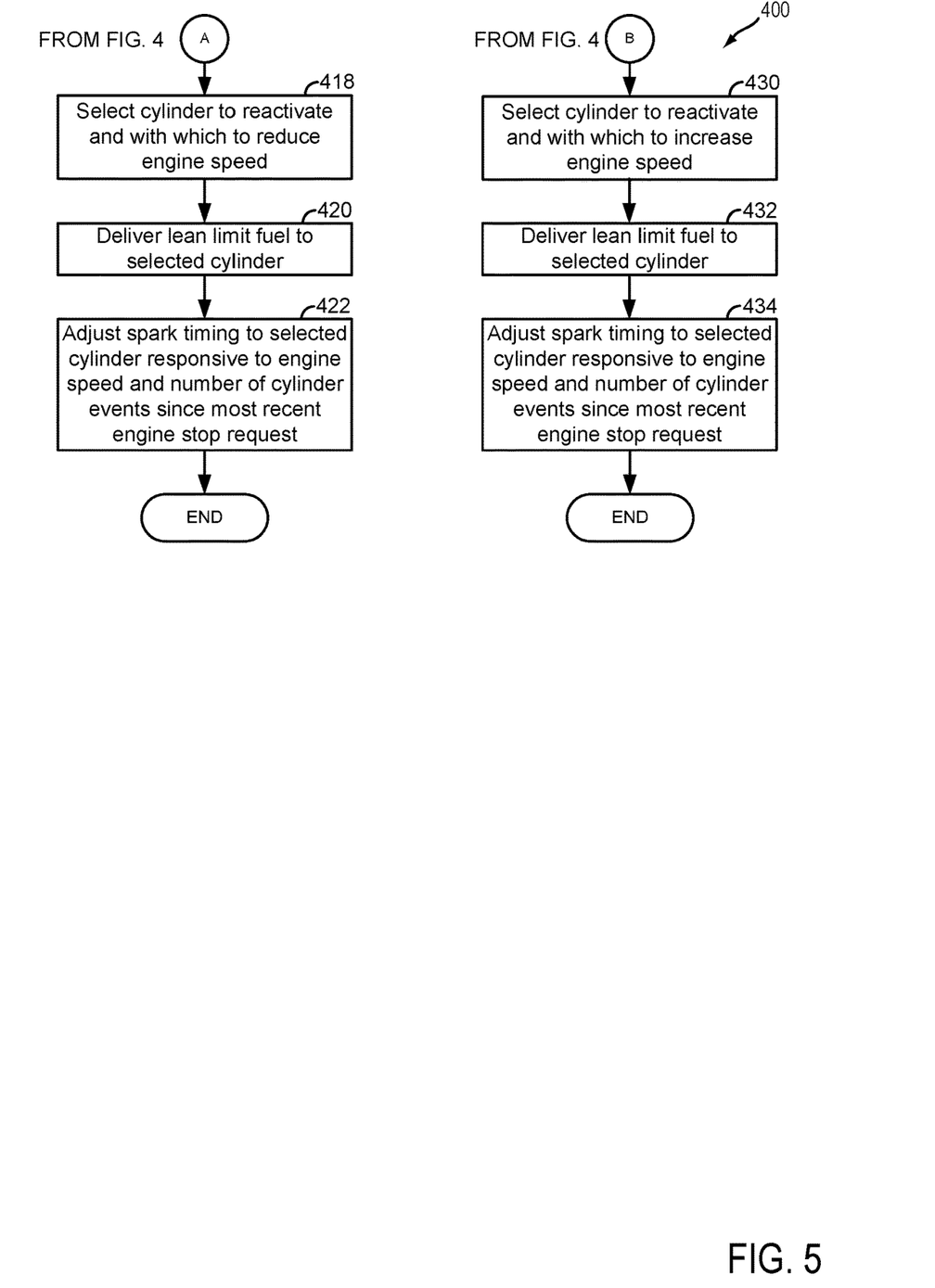

The present description is related to operating an engine of a vehicle. In particular, the present description is related to improving engine stopping position control (e.g., the crankshaft angle at which the engine ceases rotating) so that engine starting may be improved. The engine may be of the type shown in FIG. 1. The engine may be stopped as shown in FIGS. 2 and 3 according to the method of FIGS. 4 and 5. An engine stopping method that provides event driven engine stopping is shown in FIGS. 4 and 5.

Figure 1:
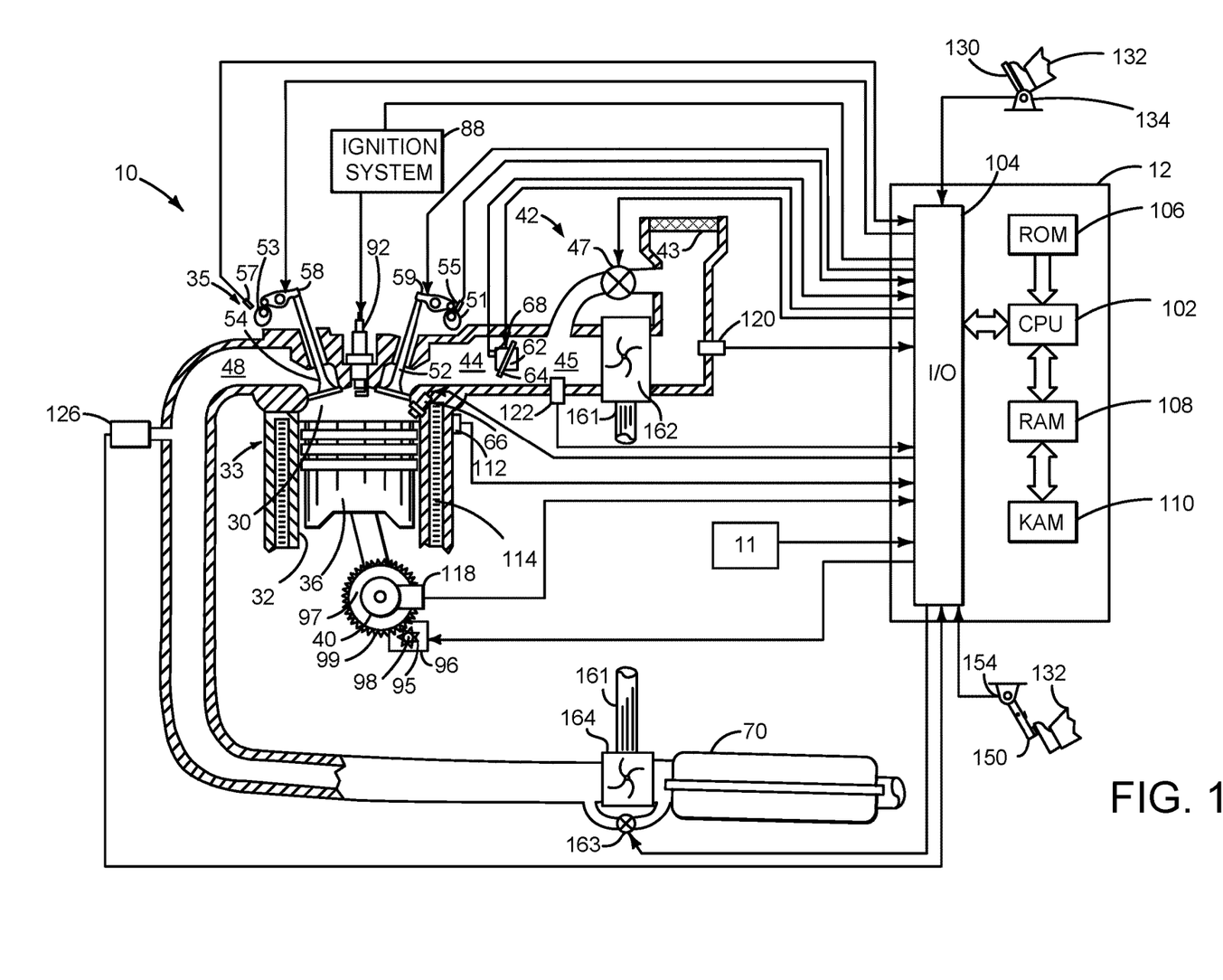
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2 and employs the actuators shown in FIGS. 1 and 2 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine)

includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation/deactivation device 59. In this example, valve activation/deactivation device 59 is an activating/deactivating rocker arm. Exhaust valve 54 may be selectively activated and deactivated by valve activation/deactivation device 58. In this example, valve activation/deactivation device 58 is an activating/deactivating rocker arm. Valve activation devices 58 and 59 may be electro-mechanical devices and they may take the form of rocker arms or other valve activating/deactivating devices (e.g., adjustable tappets, lost motion devices, etc.) in other examples.

Direct fuel injector 66 is shown positioned to inject fuel directly into cylinder 30, which is known to those skilled in the art as direct injection. Fuel injector 66 delivers liquid fuel in proportion to pulse widths provided by controller 12. Fuel is delivered to fuel injector 66 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst filter 70 can include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system, comprising: an engine; and a controller including executable instructions stored in non-transitory memory to adjust spark timing of a cylinder of the engine responsive to an actual total number of engine rotation related events occurring after a most recent engine stop request and before engine stopping and/or engine cranking after the most recent engine stop request. The system includes where the engine rotation related events include the engine's crankshaft being at a particular crankshaft position. The system includes where the engine rotation related events include opening or closing of a poppet valve of the engine. The system further comprises additional instructions to adjust an air fuel ratio of the cylinder to a lean limit air fuel ratio after the most recent engine stop request and before engine cranking after the most recent engine stop request. The system further comprises additional instructions to increasing engine rotation after the most recent engine stop request via retarding spark timing of the cylinder to after top-dead-center compression stroke of the cylinder after a most recent engine stop request and before engine cranking after the most recent engine stop request.

FIG. 2 shows a prophetic operating sequence for an engine according to the method of FIGS. 4 and 5 in cooperation with the system of FIG. 1. The plots are aligned in time and occur at a same time. The plots are time aligned and occur at the same time. The vertical lines at t0-t5 show particular times of interest during the sequence. The sequence of FIG. 2 is represents operation of a four cylinder four stroke engine with a firing order or order of combustion of 1, 3, 4, and 2. The horizontal axis of each plot is subdivided by vertical lines 270 and the vertical lines represent beginning of one engine cycle and end or an adjacent engine cycle. Not all of the engine cycle markers are identified by marker 270 so that figure busyness may be reduced. Further, some of the horizontal axes are further subdivided to indicate strokes of individual cylinders.

The first plot from the top of FIG. 2 is a plot of an engine stop request versus engine cycles (e.g., one engine cycle is two revolutions of the engine's crankshaft). The vertical axis represents the state of the engine stop request and the engine stop request is asserted when trace 202 is at a higher level near the vertical axis arrow. The engine stop request is not asserted when trace 202 is at a level near the horizontal axis. The engine is requested to stop (e.g., cease rotating and combusting fuel) when trace 202 is at the higher level. The engine is running (e.g., combusting fuel) when trace 202 is at a lower level near the horizontal axis. The horizontal axis represents engine cycles and the actual total number of engine cycles increases from the left side of the figure to the right side of the figure. Trace 202 represents the engine speed.

The second plot from the top of FIG. 2 is a plot of spark timing for cylinder number one versus engine cycles, and each engine cycle is subdivided by the strokes of cylinder number one. Spark events for cylinder number one are indicated via asterisks 203-205. The strokes of cylinder one are indicated via the designations "c" for compression, "p" for power or expansion, "e" for exhaust, and "i" for intake. Fuel injection timing for cylinder one is indicated by the bars 220-222. The horizontal axis represents engine cycles and the actual total number of engine cycles increases from the left side of the figure to the right side of the figure.

The third plot from the top of FIG. 2 is a plot of spark timing for cylinder number three versus engine cycles, and each engine cycle is subdivided by the strokes of cylinder number three. Spark events for cylinder number three are indicated via asterisks 206 and 207. The strokes of cylinder three are indicated via the previously identified designations. Fuel injection timing for cylinder three is indicated by the bars 223 and 224. The horizontal axis represents engine cycles and the actual total number of engine cycles increases from the left side of the figure to the right side of the figure.

The fourth plot from the top of FIG. 2 is a plot of spark timing for cylinder number four versus engine cycles, and each engine cycle is subdivided by the strokes of cylinder number four. Spark events for cylinder number four are indicated via asterisks 208 and 209. The strokes of cylinder four are indicated via the previously identified designations. Fuel injection timing for cylinder four is indicated by the bars 225 and 226. The horizontal axis represents engine cycles and the actual total number of engine cycles increases from the left side of the figure to the right side of the figure.

The fifth plot from the top of FIG. 2 is a plot of spark timing for cylinder number two versus engine cycles, and each engine cycle is subdivided by the strokes of cylinder number two. The spark event for cylinder number two is indicated via asterisk 210. The strokes of cylinder two are indicated via the previously identified designations. Fuel injection timing for cylinder two is indicated by the bar 227. The horizontal axis represents engine cycles and the actual total number of engine cycles increases from the left side of the figure to the right side of the figure.

The sixth plot from the top of FIG. 2 is a plot of engine speed versus engine cycles. The vertical axis represents engine speed and engine speed increases in the direction of the vertical axis arrow. Engine speed is zero at the level of the horizontal axis. Trace 212 represents the engine speed. The horizontal axis represents engine cycles and the actual total number of engine cycles increases from the left side of the figure to the right side of the figure.

At time t0, the engine is rotating and combusting fuel. Spark timing for each engine cylinder is advanced from top-dead-center compression stroke and engine speed is greater than engine idle speed. The engine rotates through more than one engine cycle between time t0 and time t1. The engine operates with a substantially stoichiometric air-fuel ratios (e.g., within ±0.5 air-fuel ratios of a stoichiometric air-fuel ratio for the fuel that is presently being combusted by the engine) in each engine cylinder between time t0 and time t1.

At time t1, the engine stop request is asserted. The engine stop request may be asserted or requested via a vehicle controller in response to vehicle operating conditions. Alternatively, the engine stop request may be asserted via a human driver of the vehicle. The engine controller changes modes from adjusting spark timing as a function of engine speed and engine load to adjusting spark timing in response to an actual total number of cylinder events or engine events since the most recent engine stop request (e.g., the engine stop request at time t1). Further, the engine controller completes injecting fuel into cylinders that have started to receive fuel and then stops injecting fuel to those cylinders. The engine also combusts the fuel that has been injected to the cylinders that have started to receive fuel before the engine stop request is asserted. The engine controller also stops injection of fuel into the engine's cylinders that were not receiving fuel at the time that the engine stop request was received. In some examples, the controller may also deactivate poppet valves of engine cylinders and adjust engine throttle position according to the actual total number of cylinder or engine events since the most recent engine stop request in response to the engine stop request.

A cylinder event may be a piston of the cylinder reaching a predetermined position (e.g., top-dead-center compression stroke, or bottom-dead-center exhaust stroke, etc.) or another cylinder related event (e.g., intake or exhaust valves of the cylinder opening or closing). An engine event may be the engine's crankshaft reaching a predetermined crankshaft angle (e.g., zero degrees) the engine's camshafts reaching a predetermined position, or another engine rotation related event.

In this example, spark timing for cylinder number one just after time t1 is equivalent to spark timing for cylinder number one between time t0 and time t1. Spark timing for cylinder number three after time t1 is retarded toward top-dead-center compression stroke of cylinder three so that engine speed may be reduced at a greater rate as compared to if the engine stop request occurred when the engine was rotating at idle speed. Cylinder numbers one and three are the only two cylinders that have fuel inside the cylinders or are receiving fuel at time t1. Therefore, combustion in cylinder numbers one and three is the only combustion in the engine during the first engine cycle after the request to stop the engine is received at time t1. The spark timing of the cylinders receiving fuel during or just before the engine stop request may be nominal base spark timing, retarded from base spark timing, or advanced from base spark timing. The spark timing may be a function of a requested torque responsive to the engine stop request. The engine proceeds to decelerate after the spark is delivered to cylinder number three to initiate combustion in cylinder number three just after time t1. Engine speed is reduced as the engine decelerates in response to the request to stop the engine. The controller may estimate an engine stopping position one or more times during each engine cycle as the engine decelerates. In one example, the engine stopping position may be estimated based on the engine's present speed at a time of an engine or cylinder event, throttle position, engine temperature, and ambient pressure.

Just before time t2, the engine stopping position is estimated by the controller to fall outside of a desired crankshaft window (e.g., a crankshaft angular window where it is desired for the engine to stop rotating, such as between 630 and 650 crankshaft degrees after top-dead-center compression stroke cylinder number one). Therefore, at time t2, an amount of fuel is injected into cylinder number four that generates a lean limit air-fuel mixture (e.g., the lean air-fuel limit is an air-fuel ratio that generates a standard deviation of indicated mean effective pressure in the cylinder to be less than a threshold value after the air and fuel are combusted in the cylinder) in cylinder number four. By combusting an air-fuel mixture that is at a lean limit to stop the engine within a desired crankshaft window, it may be possible to conserve fuel used to stop the engine at a desired location. In some examples, the engine air-fuel ratio may be adjusted as a function of a desired or requested engine torque. Fuel is injected at time t2 to prolong or extend engine rotation when the engine stopping position is expected or predicted to be before a desired crankshaft window. Cylinder number four is temporarily reactivated by injecting the fuel and igniting the fuel at time t3. In another example, the amount of fuel that is injected at time t2 may be a function of the actual number of cylinder events since the most recent engine stop request. This may allow repeatable amounts of fuel to be injected to the engine so that engine stopping may be made more consistent.

At time t3, a spark is delivered to cylinder number four to ignite the fuel that was injected at time t2. The timing of the spark at time t3 is retarded from top-dead-center compression stroke of cylinder number four so that the engine accelerates a rather small amount. Thus, by igniting the air-fuel mixture in cylinder four at a retarded timing, the engine crankshaft accelerates only a small amount. The engine speed increases by a small amount and the engine stop request remains asserted.

Just before time t4, the engine stopping position is estimated by the controller to fall outside of a desired crankshaft window (e.g., a crankshaft angular window where it is desired for the engine to stop rotating, such as between 630 and 650 crankshaft degrees after top-dead-center compression stroke cylinder number one). Therefore, at time t4, an amount of fuel is injected into cylinder number one that generates a lean limit air-fuel mixture in cylinder number one. Fuel is injected at time t4 to reduce engine rotation and stop engine rotation sooner. Cylinder number one is temporarily reactivated by injecting the fuel and igniting the fuel at time t5. In another example, the amount of fuel that is injected at time t4 is a function of the actual number of cylinder events since the most recent engine stop request.

At time t5, a spark is delivered to cylinder number one to ignite the fuel that was injected at time t4. The timing of the spark at time t5 is advanced from top-dead-center compression stroke of cylinder number one so that the engine deaccelerates via pressure that builds in cylinder number one before top-dead-center compression stroke of cylinder number one is reached. Thus, by igniting the air-fuel mixture in cylinder one at an advanced timing, the engine crankshaft decelerates quickly to zero speed. The engine stop request remains asserted.

In this way, control of fuel injection and spark timing after a most recent request to stop an engine to zero speed may be performed as a function of an actual total number of cylinder events since the most recent engine stop request. Further, the ignition timing may be adjusted to accelerate or decelerate the engine so that the engine may stop within a desired crankshaft window.

FIG. 3 shows a second prophetic operating sequence for an engine according to the method of FIGS. 4 and 5 in cooperation with the system of FIG. 1. The plots are aligned in time and occur at a same time. The plots are time aligned and occur at the same time. The vertical lines at t10-t13 show particular times of interest during the sequence. The sequence of FIG. 3 is represents operation of a four cylinder four stroke engine with a firing order or order of combustion of 1, 3, 4, and 2. The horizontal axis of each plot is subdivided by vertical lines 270 and the vertical lines represent beginning of one engine cycle and end or an adjacent engine cycle. Not all of the engine cycle markers are identified by marker 270 so that figure busyness may be reduced. Further, some of the horizontal axes are further subdivided to indicate strokes of individual cylinders.

The first plot from the top of FIG. 3 is a plot of an engine stop request versus engine cycles (e.g., one engine cycle is two revolutions of the engine's crankshaft). The vertical axis represents the state of the engine stop request and the engine stop request is asserted when trace 302 is at a higher level near the vertical axis arrow. The engine stop request is not asserted when trace 302 is at a level near the horizontal axis. The engine is requested to stop (e.g., cease rotating and combusting fuel) when trace 302 is at the higher level. The engine is running (e.g., combusting fuel) when trace 302 is at a lower level near the horizontal axis. The horizontal axis represents engine cycles and the actual total number of engine cycles increases from the left side of the figure to the right side of the figure. Trace 302 represents the engine speed.

The second plot from the top of FIG. 3 is a plot of spark timing for cylinder number one versus engine cycles, and each engine cycle is subdivided by the strokes of cylinder number one. Spark events for cylinder number one are indicated via asterisks 303-305. The strokes of cylinder one are indicated via the designations "c" for compression, "p"

for power or expansion, "e" for exhaust, and "i" for intake. Fuel injection timing for cylinder one is indicated by the bars 320-322. The horizontal axis represents engine cycles and the actual total number of engine cycles increases from the left side of the figure to the right side of the figure.

The third plot from the top of FIG. 3 is a plot of spark timing for cylinder number three versus engine cycles, and each engine cycle is subdivided by the strokes of cylinder number three. Spark events for cylinder number three are indicated via asterisks 306 and 307. The strokes of cylinder three are indicated via the previously identified designations. Fuel injection timing for cylinder three is indicated by the bars 323 and 324. The horizontal axis represents engine cycles and the actual total number of engine cycles increases from the left side of the figure to the right side of the figure.

The fourth plot from the top of FIG. 3 is a plot of spark timing for cylinder number four versus engine cycles, and each engine cycle is subdivided by the strokes of cylinder number four. Spark events for cylinder number four are indicated via asterisks 308-310. The strokes of cylinder four are indicated via the previously identified designations. Fuel injection timing for cylinder four is indicated by the bars 325-327. The horizontal axis represents engine cycles and the actual total number of engine cycles increases from the left side of the figure to the right side of the figure.

The fifth plot from the top of FIG. 3 is a plot of spark timing for cylinder number two versus engine cycles, and each engine cycle is subdivided by the strokes of cylinder number two. The spark events for cylinder number two are indicated via asterisk 311 and 312. The strokes of cylinder two are indicated via the previously identified designations. Fuel injection timings for cylinder two are indicated by the bars 328 and 329. The horizontal axis represents engine cycles and the actual total number of engine cycles increases from the left side of the figure to the right side of the figure.

The sixth plot from the top of FIG. 3 is a plot of engine speed versus engine cycles. The vertical axis represents engine speed and engine speed increases in the direction of the vertical axis arrow. Engine speed is zero at the level of the horizontal axis. Trace 313 represents the engine speed. The horizontal axis represents engine cycles and the actual total number of engine cycles increases from the left side of the figure to the right side of the figure.

At time t10, the engine is rotating at idle speed and combusting fuel. Spark timing for each engine cylinder is advanced from top-dead-center compression stroke. The engine rotates through nearly two engine cycles between time t10 and time t11. The engine operates with a substantially stoichiometric air-fuel ratios (e.g., within ±0.5 air-fuel ratios of a stoichiometric air-fuel ratio for the fuel that is presently being combusted by the engine) in each engine cylinder between time t10 and time t11.

At time t11, the engine stop request is asserted. The engine controller changes modes from adjusting spark timing as a function of engine speed and engine load to adjusting spark timing in response to an actual total number of cylinder events or engine events since the most recent engine stop request (e.g., the engine stop request at time t11). Further, the engine controller completes injecting fuel into cylinders that have started to receive fuel and then stops injecting fuel to those cylinders. The engine controller also stops injection of fuel into the engine's cylinders that were not receiving fuel at the time that the engine stop request was received.

In this example, spark timing for cylinder number two just after time t1 is equivalent to spark timing for cylinder number two between time t10 and time t11. Spark timing for cylinder number one shortly after time t11 is also equivalent to its previous timing since the engine is requested to stop beginning at idle speed and quicker engine stopping may not be desired so that the engine stops as expected. Cylinder numbers two and one are the only two cylinders that have fuel inside the cylinders or are receiving fuel at time t11. Therefore, combustion in cylinder numbers two and one is the only combustion in the engine during the first engine cycle after the request to stop the engine is received at time t11. The engine proceeds to decelerate after the spark is delivered to cylinder number one to initiate combustion in cylinder number one just after time t11. Engine speed is reduced as the engine decelerates in response to the request to stop the engine. The controller may estimate an engine stopping position one or more times during each engine cycle as the engine decelerates.

Just before time t12, the engine stopping position is estimated by the controller to fall outside of a desired crankshaft window (e.g., a crankshaft angular window where it is desired for the engine to stop rotating, such as between 630 and 650 crankshaft degrees after top-dead-center compression stroke cylinder number one). Therefore, at time t12, an amount of fuel is injected into cylinder number four that generates a lean limit air-fuel mixture in cylinder number four. Fuel is injected at time t12 to move the engine back into the desired crankshaft window for engine starting. Cylinder number four is temporarily reactivated by injecting the fuel and igniting the fuel at time t13. In another example, the amount of fuel that is injected at time t12 is a function of the actual number of cylinder events since the most recent engine stop request. This may allow repeatable amounts of fuel to be injected to the engine so that engine stopping may be made more consistent.

At time t13, a spark is delivered to cylinder number four to ignite the fuel that was injected at time t12. The timing of the spark at time t13 is advanced from top-dead-center compression stroke of cylinder number four while engine speed is low so that the engine slows and reverses its direction of crankshaft rotation. Thus, by igniting the air-fuel mixture in cylinder four at an advanced timing when engine speed is low, the engine crankshaft may reverse direction and move back into a crankshaft window for engine starting that was previously passed. The engine comes to a full stop (e.g., zero speed) shortly after time t13.

In this way, control of fuel injection and spark timing after a most recent request to stop an engine to zero speed may be performed as a function of an actual total number of cylinder events since the most recent engine stop request. Further, the ignition timing may be adjusted to reverse engine rotation so that the engine may stop within a desired crankshaft window.

Referring now to FIGS. 4 and 5, a flow chart of a method for stopping an engine responsive to an actual total number of cylinder or engine events after a most recent engine stop request is shown. The method of FIGS. 4 and 5 may be incorporated into and may cooperate with the system of FIG. 1. Further, at least portions of the method of FIGS. 4 and 5 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to vehicle speed, engine speed, engine temperature, engine load, driver demand torque, and engine position. Method 400 proceeds to 404.

At 404, method 400 judges if an engine stop is requested. The engine may be operated as described at step 430 until an engine stop is requested. An engine stop (e.g., ceasing engine rotation and combustion within the engine) may be requested via a human driver or a vehicle controller. The engine may be stopped responsive to vehicle operating conditions where the vehicle includes an engine that may be automatically stopped and started. Method 400 may judge that an engine stop request has been requested based on a value that is stored in a variable in controller memory. For example, the variable may be equal to a value of one if an engine stop is requested. The variable may be equal to a value of zero if an engine stop is not requested. If method 400 judges that an engine stop is requested, the answer is yes and method 400 proceeds to 406. Otherwise, the answer is no and method 400 proceeds to 430.

At 430, method 400 operates the engine according to or responsive to driver demand torque and vehicle speed. The driver demand torque may be determined via a position of an accelerator pedal. The accelerator pedal position and vehicle speed may reference a table or function of empirically determined driver demand torque values. The table or function outputs the driver demand torque. The driver demand torque request may be converted into an engine air flow amount and fuel amount for the engine to provide the driver demand torque. The engine spark timing is delivered responsive to engine load and engine speed. Method 400 proceeds to exit.

At 406, method 400 ceases to inject fuel to cylinders that are not presently receiving fuel. Further, method 400 completes injection of fuel amounts that are presently being injected. Method 400 may also begin counting an actual total number of engine or spark events since the most recent engine stop request. Method 400 proceeds to 408.

At 408, method 400 judges if engine speed is greater than a threshold speed (e.g., a warm engine idle speed). If method 400 judges that the present engine speed is greater than the threshold speed, the answer is yes and method 400 proceeds to 410. Otherwise, the answer is no and method 400 proceeds to 412.

At 410, method 400 retards spark timing of cylinder that are or were receiving fuel when the engine stop request was asserted. By retarding spark timing of cylinders that are combusting air and fuel mixtures, the engine speed may be reduced so that the engine reaches a stopped state sooner. By reducing engine speed sooner, vehicle occupants may find that the engine stop sequence is within an expected engine stop timing range so as to not cause the vehicle occupants concern. Method 400 proceeds to 412.

At 412, method 400 estimates the engine stop position. In one example, method 400 may estimate the engine stop position based on present engine rotational speed, present engine position, ambient air pressure, engine temperature, and engine valve timings. In one example, the engine stop position estimate may be generated via tables or functions that include empirically determined engine stopping positions and that are indexed or referenced via the present engine rotational speed, present engine position, ambient air pressure, engine temperature, and engine valve timings. Values in the tables or functions may be determined via monitoring the engine rotational speed, present engine position, ambient air pressure, engine temperature, and engine valve timings while performing a series of engine stops. Method 400 proceeds to 414.

At 414, method 400 judges whether or not the estimated engine stopping position is within one or more predetermined engine crankshaft windows (e.g., a range of crankshaft angular degrees, such as between 630 and 650 crankshaft degrees after top-dead-center compression stroke cylinder number one). If method 400 judges that the estimated engine stopping position is within the one or more predetermined engine crankshaft windows, the answer is yes and method 400 proceeds to exit. Otherwise, the answer is no and method 400 proceeds to 416.

At 416, method 400 judges if an engine speed reduction is desired to put the engine's stopping position within a desired crankshaft window. In one example, method 400 may judge that an engine speed reduction is desired if the engine's present speed is greater than an engine speed trajectory, the engine speed trajectory being a function of an actual total number of cylinder or engine events since the most recent engine stop request. Further, method 400 may judge that an engine speed reduction may be desirable to reverse engine rotation if the engine is rotating at less than a threshold speed and the engine has rotated past the desired or requested engine crankshaft window. If method 400 judges to reduce the engine speed so that the engine may stop in the desired or requested crankshaft window, then the answer is yes and method 400 proceeds to 418. Otherwise, the answer is no and method 400 proceeds to 430.

At 418, method 400 selects a cylinder to reactivate and to apply to reduce the engine speed so that the engine may stop in the requested crankshaft window. In one example, method 400 indexes or references a table or function according to the present actual total number of cylinder or engine events since a most recent engine stop request. Further, the table or function may also be referenced via other engine operating conditions such as present engine speed, ambient pressure, valve timing, etc. The table or function outputs a cylinder to reactivate. Method 400 proceeds to 420.

At 420, method 400 injects an amount of fuel to the cylinder that is being reactivated. The amount of fuel injected to the cylinder being reactivated generates a lean limit air-fuel ratio in the cylinder. Alternatively, the amount of fuel injected to the cylinder that is being reactivated may be a function of an actual total number of engine or cylinder events since the most recent engine stop request and before the engine stops after the most recent engine stop request. Method 400 may also reactivate one or more poppet valves of the cylinder that is being reactivated. Method 400 proceeds to 422.

At 422, method adjusts spark timing of the cylinder that is being reactivated. The spark timing is a function of the actual total number of engine or cylinder events since the most recent request to deactivate the engine. For example, method 400 may reference a table or function of empirically determined spark values via the actual total number of engine or cylinder events since the most recent request to deactivate the engine. The table or function outputs a desired or requested spark timing. If the engine speed is less than a threshold speed and reverse engine rotation is desired to stop the engine in the requested crankshaft window, then method 400 may advance spark timing before top-dead-center compression stroke of the cylinder being reactivated. Method 400 may also advance spark timing before top-dead-center compression stroke of the cylinder to decelerate the engine into the desired or requested crankshaft window. In addition, the spark timing may be adjusted as a function of engine speed. Method 400 delivers the spark and proceeds to exit.

At 430, method 400 selects a cylinder to reactivate and to apply to increase the engine speed so that the engine may stop in the requested crankshaft window. In one example, method 400 indexes or references a table or function according to the present actual total number of cylinder or engine events since a most recent engine stop request. Further, the table or function may also be referenced via other engine operating conditions such as present engine speed, ambient pressure, valve timing, etc. The table or function outputs a cylinder to reactivate. Method 400 proceeds to 432.

At 432, method 400 injects an amount of fuel to the cylinder that is being reactivated. The amount of fuel injected to the cylinder being reactivated generates a lean limit air-fuel ratio in the cylinder. Alternatively, the amount of fuel that is injected may be a function of an actual total number of engine or cylinder events since a most recent engine stop request before the engine stops after the most recent engine stop request. Method 400 proceeds to 434.

At 434, method adjusts spark timing of the cylinder that is being reactivated. The spark timing is a function of the actual total number of engine or cylinder events since the most recent request to deactivate the engine. For example, method 400 may reference a table or function of empirically determined spark values via the actual total number of engine or cylinder events since the most recent request to deactivate the engine. The table or function outputs a desired or requested spark timing. Method 400 may retard spark timing of the cylinder being reactivated to a timing that is after top-dead-center compression stroke of the cylinder being reactivated. The retarded spark timing may accelerate the engine by a small amount so that the crankshaft does not accelerate through the desired crankshaft window. In addition, the spark timing may be adjusted as a function of engine speed. Method 400 delivers the spark and proceeds to exit.

In this way, the engine's speed may be adjusted so that the engine stops within a desired crankshaft window. By adjusting spark timing and selecting a cylinder to reactivate in response to an actual total number of cylinder or engine events after a most recent engine stop request and before the engine stops, it may be possible to provide more repeatable engine stops so that engine emissions and engine run-on may be reduced.

Thus, the method of FIG. 4 provides for a driveline operating method, comprising: via a controller, transitioning from adjusting spark timing of a cylinder responsive to engine load and engine speed to adjusting the spark timing of the cylinder responsive to an actual total number of cylinder events occurring after a most recent engine stop request in response to the most recent engine stop request. The method further comprises adjusting the spark timing of the cylinder responsive to engine speed in response to the most recent engine stop request. The method further comprises adjusting the spark timing of the cylinder responsive to barometric pressure in response to the most recent engine stop request. The method includes where the actual total number of cylinder events include an actual total number of instances when the cylinder reaches a predetermined cylinder position. The method includes where the predetermined cylinder position is top-dead-center compression stroke. The method includes where the actual total number of cylinder events include an actual total number of instances when a cylinder related event occurs. The method includes where the cylinder related event is a valve opening or closing of the cylinder. The method further comprises ceasing to deliver spark to the cylinder while transitioning from adjusting spark timing of the cylinder responsive to engine load and engine speed to adjusting spark timing of the cylinder responsive to the actual total number of cylinder events from the most recent engine stop request in response to the most recent engine stop request.

The method of FIG. 4 also provides for a driveline operating method, comprising: via a controller, transitioning from operating a cylinder with a substantially stoichiometric air-fuel ratio to operating the cylinder with a substantially lean limited air-fuel ratio in response to a most recent engine stop request. The method further comprises ceasing to deliver fuel to the cylinder while transitioning from operating the cylinder with the substantially stoichiometric air-fuel ratio to operating the cylinder with the substantially lean limited air-fuel ratio. The method further comprises counting an actual total number of cylinder events since the most recent engine stop request. The method further comprises adjusting spark timing of the cylinder in response to the actual total number of cylinder events since the most recent engine stop request. The method further comprises retarding a spark timing of the cylinder in response to the most recent engine stop request. The method further comprises increasing engine rotation via retarding spark timing of the cylinder to after top-dead-center compression stroke of the cylinder after the most recent engine stop request and before an engine that includes the cylinder stops rotating. The method further comprises reversing engine rotation via advancing spark timing of the cylinder to a crankshaft position before top-dead-center compression stroke of the cylinder after the most recent engine stop request and before an engine that includes the cylinder stops rotating.

In another representation, the method includes via a controller, transitioning from adjusting spark timing of a cylinder responsive to engine load and engine speed and a valve timing to adjusting the spark timing and the valve timing of the cylinder responsive to an actual total number of cylinder events occurring after a most recent engine stop request in response to the most recent engine stop request. The method includes adjusting the valve timing to restart valve operation from a stopped state where the valve remains closed during a first engine cycle to a state where the valve opens and closes during a second engine cycle. The method includes adjusting the valve timing to adjust a cylinder air charge.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A driveline operating method, comprising:
via a controller, in response to a most recent engine stop request and before an engine comes to a full stop, transitioning from adjusting a spark timing of a cylinder responsive to an engine load and an engine speed to adjusting the spark timing of the cylinder responsive to an actual total number of cylinder events occurring after the most recent engine stop request, where the actual total number of cylinder events include an actual total number of instances when the cylinder reaches top-dead-center compression stroke.

2. The method of claim 1, further comprising adjusting the spark timing of the cylinder responsive to the engine speed in response to the most recent engine stop request.

3. The method of claim 2, further comprising adjusting the spark timing of the cylinder responsive to a barometric pressure in response to the most recent engine stop request.

4. The method of claim 1, where the actual total number of cylinder events include an actual total number of instances when a cylinder related event occurs.

5. The method of claim 4, where the cylinder related event is a valve opening or closing of the cylinder.

6. The method of claim 1, further comprising ceasing to deliver spark to the cylinder while transitioning from adjusting spark timing of the cylinder responsive to engine load and engine speed to adjusting spark timing of the cylinder responsive to the actual total number of cylinder events from the most recent engine stop request in response to the most recent engine stop request.

7. A driveline operating method, comprising:
via a controller, in response to a most recent engine stop request and before an engine comes to a full stop, transitioning from operating a cylinder with a stoichiometric air-fuel ratio to operating the cylinder with a lean limited air-fuel ratio; and
adjusting a spark timing of the cylinder in response to an actual total number of cylinder events occurring after the most recent engine stop request, where the actual total number of cylinder events include an actual total number of instances when the cylinder reaches top-dead-center compression stroke.

8. The method of claim 7, further comprising ceasing to deliver fuel to the cylinder while transitioning from operating the cylinder with the stoichiometric air-fuel ratio to operating the cylinder with the lean limited air-fuel ratio.

9. The method of claim 7, further comprising retarding a spark timing of the cylinder in response to the most recent engine stop request.

10. The method of claim 7, further comprising increasing engine rotation via retarding spark timing of the cylinder to after top-dead-center compression stroke of the cylinder after the most recent engine stop request and before an engine that includes the cylinder stops rotating.

11. The method of claim 7, further comprising reversing engine rotation via advancing spark timing of the cylinder to a crankshaft position before top-dead-center compression stroke of the cylinder after the most recent engine stop request and before the cylinder stops rotating.

12. A system comprising:
an engine; and
a controller including executable instructions stored in non-transitory memory to: responsive to a most recent engine stop request and before the engine comes to a full stop, adjust spark timing of a cylinder of the engine responsive to an actual total number of engine rotation related events occurring after the most recent engine stop request, where the engine rotation related events include the engine's crankshaft being at a particular crankshaft position after the most recent engine stop request.

13. The system of claim 12, where the engine rotation related events include opening or closing of a poppet valve of the engine.

14. The system of claim 13, further comprising additional instructions to adjust an air fuel ratio of the cylinder to a lean limit air fuel ratio after the most recent engine stop request and before engine cranking after the most recent engine stop request.

15. The system of claim 12, further comprising additional instructions to increasing engine rotation after the most recent engine stop request via retarding spark timing of the cylinder to after top-dead-center compression stroke of the cylinder after a most recent engine stop request and before engine cranking after the most recent engine stop request.

* * * * *